B. CLEWS AND H. M. PETERSEN.
PISTON RING AND THE LIKE AND METHOD OF MANUFACTURING THE SAME.
APPLICATION FILED DEC. 4, 1919.
1,433,937.
Patented Oct. 31, 1922.
4 SHEETS—SHEET 1.
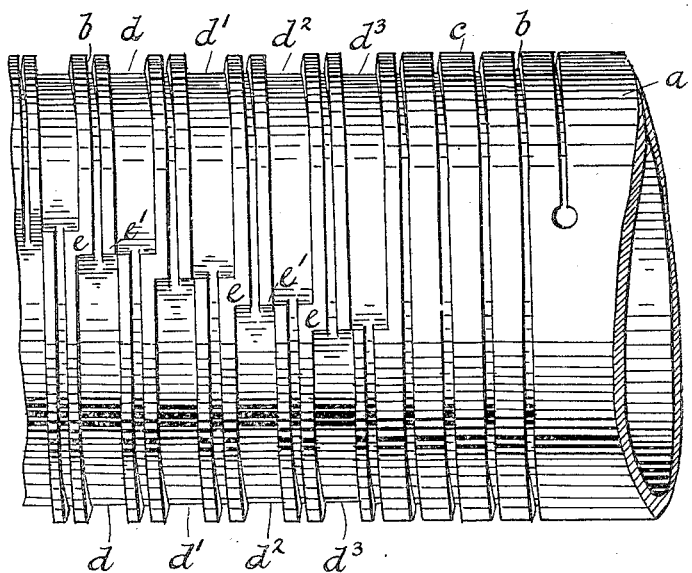
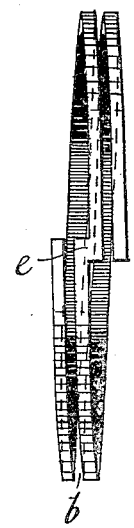
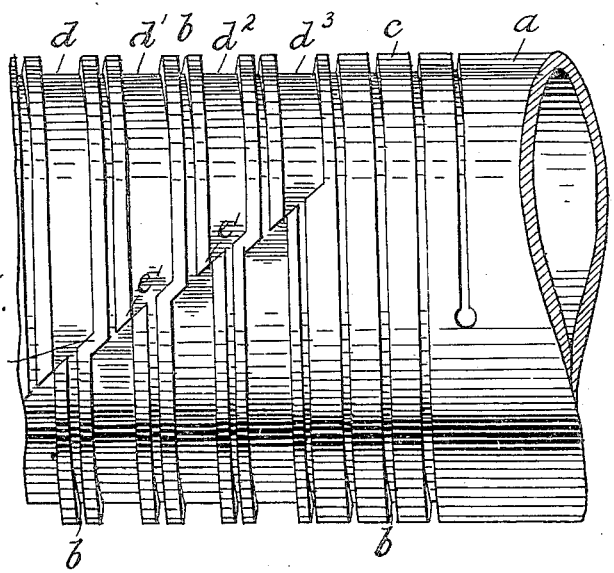

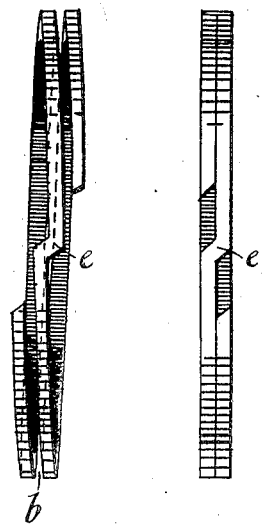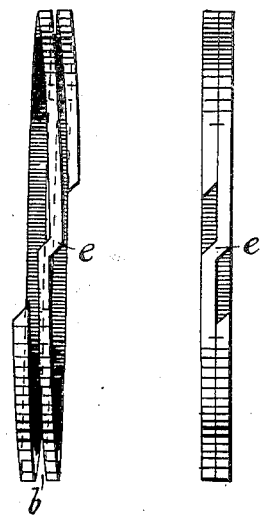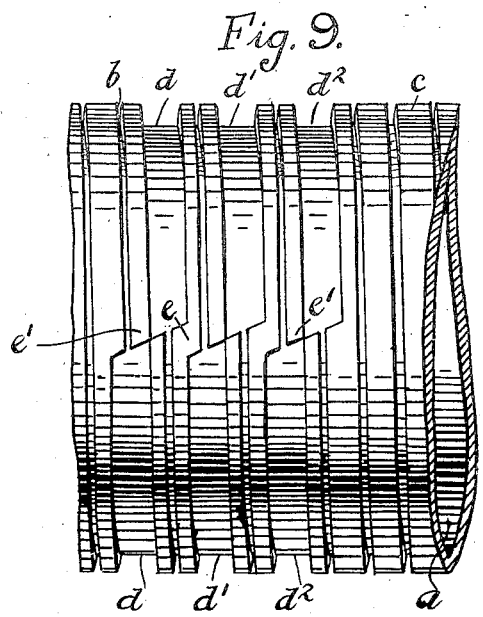

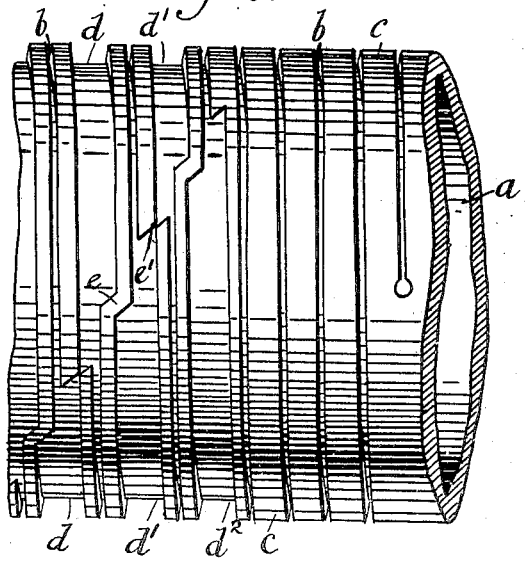
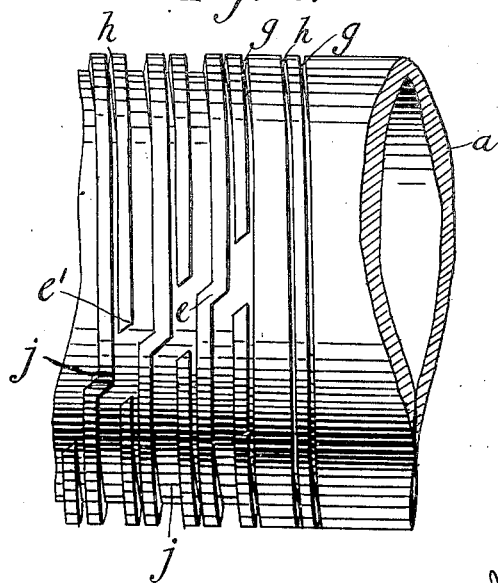

B. CLEWS AND H. M. PETERSEN.
PISTON RING AND THE LIKE AND METHOD OF MANUFACTURING THE SAME.
APPLICATION FILED DEC. 4, 1919.
1,433,937.
Patented Oct. 31, 1922.
4 SHEETS—SHEET 4.
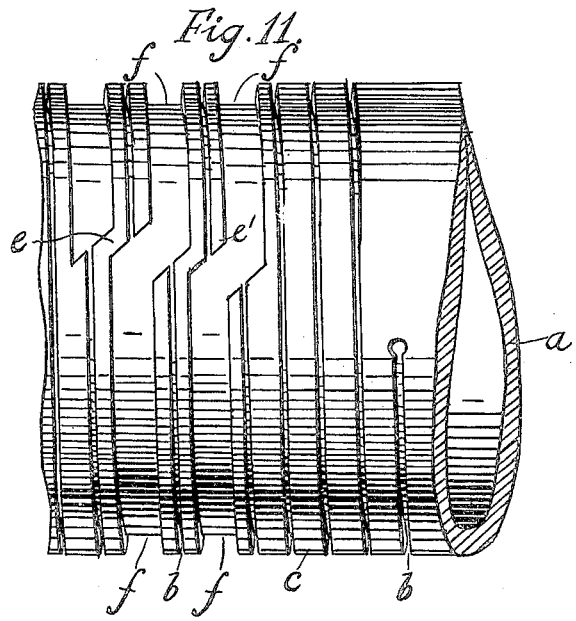
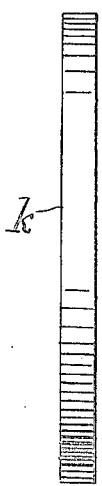
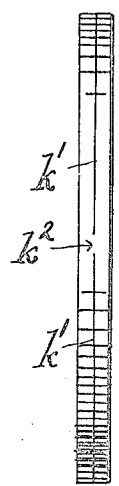
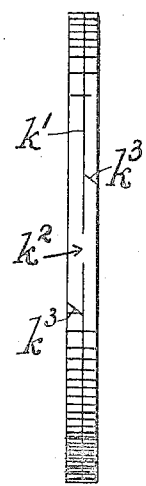
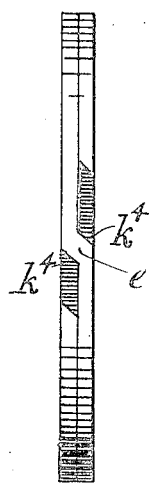
Witness:
Inventors
Bert Clews
Holger M. Petersen
by Wm H Babcock & Son
Attorneys.

Patented Oct. 31, 1922.

1,433,937

UNITED STATES PATENT OFFICE.

BERT CLEWS, OF WEST HAMPSTEAD, AND HOLGER MAGNUS PETERSEN, OF WILLESDEN GREEN, LONDON, ENGLAND.

PISTON RING AND THE LIKE AND METHOD OF MANUFACTURING THE SAME.

Application filed December 4, 1919. Serial No. 342,570.

*To all whom it may concern:*

Be it known that we, BERT CLEWS, of 37a Agamemnon Road, West Hampstead, in the county of London, N. W. 6, motor engineer, subject of George V, King of Great Britain and Ireland, and HOLGER MAGNUS PETERSEN, of 46, King's Road, Willesden Green, in the county of London, N. W. 10, tool maker, subject of Christian X, King of Denmark, have invented certain new and useful Improvements in Piston Rings and the like and Methods of Manufacturing the Same, of which the following is a specification.

This invention relates primarily to piston rings, although rings constructed in accordance with this invention have certain other uses also, for example, in connection with stuffing boxes for the purpose of maintaining a close joint around the moving member within the stuffing box. For the sake of convenience, however, the following description will be directed to the application of the invention to piston rings.

The invention has for its chief object to provide a double-coil gapped ring made in one piece whose coils are of uniform cross-section throughout. Piston rings constructed in accordance with this invention expand uniformly and, therefore, do not wear the cylinder oval or unevenly.

The accompanying drawings illustrate, in elevation, different stages in the manufacture of the ring according to the preferred manner of carrying out this invention.

Fig. 1 shows a portion of a cylinder on which the first and second stages in the manufacture have been carried out.

Fig. 2 shows a ring after it has been removed from the cylinder;

Fig. 3 shows the same after the ends of the ring have been shortened back to form the usual gaps; and Fig. 4 shows the ring ready for use.

Figs. 5 to 8 are the same as Figs. 1 to 4 excepting that Figs. 5 and 6 illustrate a modified method, according to this invention, of constructing the rings.

Figs. 9 to 16 show further modified methods, according to this invention, which may be employed in constructing the rings.

Like letters of reference indicate like parts throughout the drawings.

In carrying out this invention according to the methods illustrated in Figs. 1 to 11 of the accompanying drawings, a cylinder $a$ of cast iron is taken, and in the exterior surface thereof a parallel sided narrow helical groove $b$ is milled out to a depth equal to the desired thickness of the piston ring. The pitch of the groove is such that the thread $c$ which is left is equal in width to the desired width of the piston rings. The appearance of the cylinder is now as shown at the right hand portions of Figs. 1, 5, 9, 10 and 11.

Describing now the operation of forming the piston rings from the square thread so produced, and referring to Fig. 1, complete convolutions of half the width of the thread on opposite sides of the groove $b$ are milled out to a depth equal to that of the groove $b$, thus leaving spaces $d$, $d^1$, $d^2$, $d^3$, etc. These spaces are distinct from one another, and the contiguous ends of successive spaces are separated from one another by the portions $e$, which constitute the middle cranked portions or steps or bridges of the rings.

The skin left at the bottom of the helical groove $b$ and at the bottom of the spaces $d$—$d^3$, is sufficiently thick to form a rigid foundation for the support of the rings during the milling operations.

In order to free the rings from the cylinder, the inner skin of the cylinder is bored out to a diameter equal to that of the bed of the groove $b$ and spaces $d$—$d^3$. Thus, as the boring tool advances, the support of the rings becomes cut away, and as the boring tool reaches the farthermost points $e^1$ of successive rings (assuming the tool to be advancing from the left hand of Fig. 1) the rings fall away one after the other.

Each ring is now in the form shown in Fig. 2.

The next operation is to cut back and shape the ends of the ring, shape its middle cranked portion bridge or step $e$ as shown in Fig. 3, and clean off any irregularities there may be along the edges of the ring. This having been done, the free end portions $e^1$ of the ring are forced or worked past or across the intervening portion of the ring until they assume the position shown in Fig. 4. The ring may now be ground to the desired size and will then be ready for use. The natural tendency of the portions of the ring on opposite sides of its middle portion to return to their normal position produces a close gas-tight joint along the contacting edges.

In Figs. 5 to 8, the only difference is that the ends of the spaces $d$—$d^3$ are already shaped so that no further shaping is required on the middle portion $e$ of the ring; otherwise, the description corresponding to Figs. 1 to 4 applies.

In Fig. 9 the corresponding ends of the spaces $d$, $d^1$, $d^2$ are brought into horizontal alignment with one another, as shown, so as to facilitate the use of multiple milling cutters in milling out the said spaces. In using such cutters, they are all placed in line, whereas if multiple cutters were used in the cases shown in Figs. 1, 5, 10, 11 and 12, they would be arranged along a spiral line.

By milling out the ends of the spaces $d$, $d^1$, $d^2$, to the shape shown in Fig. 10, the ring leaves the cylinder in the form shown in Fig. 3. Thus, by this method the operations of shortening back the ends of the coil and of shaping the middle portion $e$ are dispensed with.

In Fig. 11 the milled space $f$ is continuous and of uniform width, thereby completely isolating the rings from one another.

In Fig. 12, two spiral grooves $g$ and $h$ are formed and the space $j$ is milled out to the shape shown. By this method metal is economized, as the contiguous ends of successive rings come in line with one another instead of being staggered as shown in the preceding Figures.

In each of the examples shown in Figs. 5, 9, 10, 11 and 12, the operations of removing the rings from the cylinder and of cutting back the ends of the ring (excepting in regard to Figs. 10 and 12, where the ends are already cut back) and of twisting the ring so as to bring it to a uniform width throughout, are the same as described in connection with Figures 1 to 4.

Although the removal of the external metal is preferably effected by means of milling cutters, ordinary turning tools may obviously be used. The sharp angles shown at the ends and middle portions of the rings in Figs. 5, 9, 10, 11 and 12 can be obtained by sinking the milling cutter into or through the wall of the cylinder, though of course the milling may be carried out to a uniform depth leaving rounded angles which can be shaped up after the rings have been removed from the cylinder, as hereinbefore described.

Instead of cutting the narrow spiral grooves previously to milling out the wider spaces these operations may obviously be performed in reverse order.

Referring now to Figs. 13 to 16, $k$ (Fig. 13) is a plain parallel ring turned off a cylinder. This ring is then cut through, as shown by the cut at $k^1$ in Fig. 14, throughout its entire circumference excepting for the short neck $k^2$, thereby forming two coils. Then the slanting cuts $k^3$ are made, as shown in Fig. 15 and finally two more such cuts are made at $k^4$ as shown in Fig. 16 in order to cut off the ends of the ring so as to form the usual gaps.

In order to bring the two coils into close contact with one another they are hammered together, or instead they may be twisted so that the ring assumes somewhat the appearance shown in Fig. 3 or Fig. 7 (but with the coils close together) and then forced back again. The ring is then faced up so as to reduce the width of the middle portion between the gaps by an amount equal to the original width of the cut $k^1$, thereby bringing the ring to a uniform width. Obviously, the order in which the splitting, gapping and facing operations are performed on this ring is immaterial.

It will be seen that in a ring constructed in accordance with this invention the cranked portion or step $e$ is narrow, being of the same width, or approximately so, as the width of each coil, and that the coils themselves extend almost completely around the entire circumference of the ring.

We claim:—

1. A method of producing a double coil piston ring or like ring comprising the following steps, namely, providing a bridge piece connecting the convolutions of the ring but out of line therewith and having parallel shoulders on its opposite sides, providing each convolution of said ring with a free end, each end being opposite one of said shoulders, and then, by one inversion process, inverting the two convolutions by causing the free ends to traverse the intervening space, bringing each of the free ends opposite the shoulder which was the more remote from it before such inversion.

2. The method of producing a piston ring or like ring consisting in making a helical groove in the exterior surface of a metal cylinder and cutting away material on opposite sides of said groove so as to leave a double coil ring having a bridge piece, shoulders and ends, freeing the ring from the cylinder and inverting the coils of the ring.

3. The method of producing a piston ring or like ring consisting in making a helical groove in the exterior surface of a cast iron cylinder, making a further helical groove in the median plane of the first mentioned groove so as to produce a double coil ring, then freeing the ring from the cylinder and finally inverting the coils of the ring.

4. As a new article of manufacture, a ring for the purposes stated having a double coil form comprising convolutions of uniform cross section connected by a bridge piece or step with proximate shoulders presented reversely on its opposite sides at the ends of said bridge piece and free resilient ends in line with said shoulders respectively, said ends being under stress by having been passed once through the intervening space from their former positions on the opposite sides of the ring.

5. As a means for producing rings, a cylinder having in its outer surface a helical groove and also helical spaces from which material has been removed that would otherwise remain upstanding between convolutions of the grooves, so that there remain upstanding on the cylinder one or more coils each comprising convolutions of uniform width, with adjacent convolutions connected together by a narrow step bridge piece or cranked portion.

6. The method of producing piston rings or like rings consisting in making sets of parallel helical grooves of two different widths in the exterior surface of a cylinder; those of one width alternating with those of the other; those of the less width separating the two convolutions of each ring, while those of the greater width separate the successive rings, provide the bridge pieces connecting the convolutions of the rings, and free the ends of the convolutions of each ring.

7. The method of producing piston rings or like rings consisting in making sets of parallel grooves of two different widths in the exterior surface of a cylinder; those of one width alternating with those of the other; those of the less width separating the two convolutions of each ring while those of the greater width separate the successive rings, provide the bridge pieces connecting the convolutions of the rings, and free the ends of the convolutions of each ring, freeing said rings from said cylinder, and inverting said rings.

8. The method of producing piston rings or like rings consisting in making sets of parallel helical grooves of two different widths in the exterior surface of a cylinder; each of said grooves extending circumferentially once around said cylinder; those of one width alternating with those of the other; those of the less width separating the two convolutions of each ring while those of the greater width separate the successive rings, provide the bridge pieces connecting the convolutions of the rings and free the ends of the convolutions of each ring.

9. A piston ring or like ring comprising two parallel spiral convolutions of the same width throughout and a cranked bridge out of line with said convolutions but connecting them, said convolutions being maintained under continual and permanent tension due to the tendency of the convolutions to return to their original relative positions from which they have been displaced by a single inversion by passing each convolution once through the ring to the opposite side thereof.

10. The method of producing piston rings or like rings consisting in making a helical groove in the exterior surface of a metal cylinder and cutting away material on opposite sides of said groove so as to leave a double coil ring comprising two distinct parallel spiral coils, a bridge piece connecting said coils, shoulders and ends, freeing the ring from the cylinder, and inverting the coils of the ring.

In testimony whereof we have signed our names to this specification.

BERT CLEWS,
HOLGER MAGNUS PETERSEN.